(12) United States Patent
Schulz et al.

(10) Patent No.: US 11,792,944 B2
(45) Date of Patent: Oct. 17, 2023

(54) VALVE FOR PRESSURE COMPENSATION AND/OR FOR EMERGENCY VENTING OF A CONTAINER, IN PARTICULAR OF A CONTAINER OF A BATTERY OF AN ELECTRIC VEHICLE, AS WELL AS CONTAINER WITH SUCH A VALVE

(71) Applicant: KACO GmbH + Co. KG, Kirchardt (DE)

(72) Inventors: Bernd Schulz, Ilsfeld (DE); Christian Voll, Kirchardt (DE); Thomas Hein, Gemmingen (DE); Andreas Genesius, Heilbronn (DE)

(73) Assignee: KACO GmbH + Co. KG, Kirchardt (DE)

( * ) Notice: Subject to any disclaimer, the term of this patent is extended or adjusted under 35 U.S.C. 154(b) by 190 days.

(21) Appl. No.: 17/078,368

(22) Filed: Oct. 23, 2020

(65) Prior Publication Data

US 2021/0127511 A1    Apr. 29, 2021

(30) Foreign Application Priority Data

Oct. 24, 2019  (DE) .................... 10 2019 007 454.8

(51) Int. Cl.
*H05K 5/02*  (2006.01)
*F16K 17/04*  (2006.01)
(Continued)

(52) U.S. Cl.
CPC ......... *H05K 5/0213* (2013.01); *F16K 17/048* (2013.01); *F16K 17/0493* (2013.01);
(Continued)

(58) Field of Classification Search
CPC . H05K 5/0213; F16K 17/048; F16K 17/0493; F16K 17/044; F16K 17/164;
(Continued)

(56) References Cited

U.S. PATENT DOCUMENTS 2,745,431 A * 5/1956 Jensen .................. F16K 17/105
137/514.7
3,705,600 A * 12/1972 Heggen ................. F16K 15/063
137/493.2
(Continued)

FOREIGN PATENT DOCUMENTS

EP    2 586 081    5/2013

*Primary Examiner* — Minh Q Le
(74) *Attorney, Agent, or Firm* — Gudrun E. Huckett (57) ABSTRACT

The valve for pressure compensation and/or for emergency venting of a container, preferably of a housing of a vehicle battery, has a housing (6) with an inlet (6a) that is closable by at least one valve element (23) subjected to a closing force in a first position. The housing (6) is at least partially gas-permeable and preferably water-tight, and has at least one outlet (26) which is located behind the valve element (23) when the valve element (23) assumes its first position. So that in case of a malfunction even larger quantities of gas can be guided to the exterior through the valve, is the valve element for an increased pressure surpassing the closing force at the inlet (6a) is adjustable in the direction toward a second position against the closing force, in which the valve element (23) at least partially opens the outlet (26) such that the outlet (26) is directly connected in flow communication with the inlet (6a).

13 Claims, 6 Drawing Sheets

(51) Int. Cl.
H01M 50/30 (2021.01)
H01M 50/35 (2021.01)
F16K 27/02 (2006.01)
H01M 50/358 (2021.01)
H01M 50/317 (2021.01)
F16K 17/164 (2006.01)
H01M 50/308 (2021.01)
H01M 50/333 (2021.01)

(52) U.S. Cl.
CPC .......... *F16K 17/044* (2013.01); *F16K 17/164* (2013.01); *F16K 27/0209* (2013.01); *H01M 50/30* (2021.01); *H01M 50/308* (2021.01); *H01M 50/317* (2021.01); *H01M 50/333* (2021.01); *H01M 50/35* (2021.01); *H01M 50/358* (2021.01)

(58) Field of Classification Search
CPC ............ F16K 27/0209; H01M 50/308; H01M 50/317; H01M 50/333; H01M 50/35; H01M 50/358; H01M 50/30; Y02E 60/10
USPC ................. 137/510, 260, 315.05, 513.5, 588
See application file for complete search history.

(56) References Cited

U.S. PATENT DOCUMENTS

| | | | |
|---|---|---|---|
| 3,830,255 A * | 8/1974 | Freiheit | F16K 15/028 137/543.19 |
| 6,003,499 A * | 12/1999 | Devall | F02M 25/0836 123/520 |
| 6,435,848 B1 * | 8/2002 | Minami | F04B 27/1804 137/538 |
| 7,581,560 B2 * | 9/2009 | Koch | F16K 15/028 137/513.5 |
| 9,121,626 B2 * | 9/2015 | Uemura | F24F 13/28 |
| 9,435,236 B2 * | 9/2016 | Zitarosa | F01M 13/0011 |
| 9,644,356 B1 * | 5/2017 | Gass | E03B 7/078 |
| 2009/0047890 A1 * | 2/2009 | Yano | F21S 45/30 454/270 |
| 2014/0041520 A1 | 2/2014 | Daimon et al. | |
| 2017/0187018 A1 * | 6/2017 | Pflueger | H01M 50/317 |
| 2018/0097214 A1 | 4/2018 | Ogawa et al. | |
| 2018/0219200 A1 * | 8/2018 | Albukrek | H01M 50/333 |
| 2019/0386271 A1 | 12/2019 | Ogawa et al. | |

* cited by examiner

VALVE FOR PRESSURE COMPENSATION AND/OR FOR EMERGENCY VENTING OF A CONTAINER, IN PARTICULAR OF A CONTAINER OF A BATTERY OF AN ELECTRIC VEHICLE, AS WELL AS CONTAINER WITH SUCH A VALVE

BACKGROUND OF THE INVENTION

The invention concerns a valve for pressure compensation and/or for emergency venting of a container, preferably of a housing of a battery of electric vehicles, the valve provided with a housing that comprises an inlet that is closable by at least one valve element subjected to a closing force in a first position, that at least partially is gas-permeable and preferably water-tight, and with at least one outlet which is located behind the valve element when the valve element assumes its first position, as well as a container, preferably a housing of a battery of an electric vehicle, provided with such a valve.

In order to protect the battery of an electric vehicle, the individual modules comprised of a plurality of battery cells are installed in a housing. In the wall of the housing, at least one pressure compensation valve is inserted in order to enable a pressure compensation between the ambient pressure and the inner pressure of the container. Moreover, such containers are provided with an additional valve that is normally in closed position and opens only when, due to a malfunction, one or a plurality of battery cells or battery modules become damaged within the container and, as a result thereof, a large gas quantity and a high pressure are formed within a short period of time. By opening this second valve, the gases that are forming can be discharged from the container. The use of two valves is however expensive and complex.

Therefore, valves are also known in which not only a pressure compensation but also an emergency venting of the container is possible (EP 2 586 081 B1). This valve has a gas permeable valve element that, in a first position, closes off an inlet opening such that the gases contained in the container can pass through the valve element. The housing of the valve has a cover that is designed such that outlets for the gases are formed between the cover and the outer rim of the housing jacket. When an increased pressure occurs within the container due to a malfunction, the valve element is lifted off against the force of a pressure spring. In this way, the gases contained in the container can flow past the valve element to the outlet openings. The outlet openings are narrow depressions in the inner side of the cover so that the gas exchange frequently does not occur sufficiently fast enough in case of a malfunction.

The invention has the object to configure the valve of the aforementioned kind and the container such that, in case of a malfunction, even larger gas quantities can be discharged quickly to the exterior via the valve.

SUMMARY OF THE INVENTION

This object is solved for the valve of the aforementioned kind in accordance with the invention in that the valve element at an increased pressure surpassing the closing force at the inlet is adjustable in the direction toward a second position against the closing force, in which the valve element at least partially opens the outlet such that the outlet is directly connected in flow communication with the inlet, and in case of the container is solved with the valve embodied according to the invention.

The valve according to the invention is designed such that the valve element in the first position separates the inlet completely from the outlet. The inlet and the outlet are positioned on oppositely positioned sides of the valve element. When the valve element is acted upon in a direction from the inlet by a pressure that surpasses the closing force, the valve element is pushed against the closing force away from the first position (closed position) such that the outlet is at least partially opened. Depending on the magnitude of the closing force and the oppositely acting pressure, the valve element can assume different intermediate positions in which the outlet is opened more or less. The valve element can advantageously be moved into a stop position (second position) in which the outlet is completely open. In this stop position, the inlet and the outlet are located completely on the same side of the valve element. When the valve element is in the first position, the pressure changes occurring in the container can be compensated by gas exchange with the environment in normal operation. Such pressure changes occur, for example, when higher temperatures are present in the housing, for example, when the vehicle comprising the housing travels at summertime temperatures. The air which is contained in the housing expands due to the higher temperatures and can flow through the valve to the exterior so that a high pressure cannot be produced in the housing. In this way, a reliable pressure compensation in both directions is ensured.

When a malfunction occurs that produces a high pressure and a large gas quantity in the container in a short period of time, the valve element is adjusted against the closing force in the direction toward the second position in which the outlet is at least partially opened. In this way, the gases can pass through the inlet immediately to the outlet without the gases having to flow through the valve element or past the valve element. In this way, even very large gas quantities can be reliably discharged within a very short period of time so that a deformation or even bursting of the container is precluded.

With the valve according to the invention, a serial connection is provided in the described way in that the gas in normal operation flows through the valve element and, at high pressure, moves the valve element in the direction toward the second position and can reach the exterior through the at least partially opened outlet. The valve element thus contributes to the burst protection of the container.

Advantageously, the outlet is provided in a jacket of the housing. In this context, the outlet can be arranged at the housing jacket such that the outlet is positioned only slightly above the valve element in its first position. Then a relatively short adjusting stroke of the valve element is sufficient in order to release the outlet at least partially. In this way, very large gas quantities and very high pressures can be discharged within a very short period of time from the container.

In an advantageous embodiment, the valve element is contacting a stop in the second position. This second position is advantageously a sealing position whereby it is ensured that the gases do not flow past the valve element but reach immediately the outlet.

In a preferred embodiment, the stop is a socket which is surrounded at a distance by the jacket of the housing.

Expediently, the stop projects from a cover of the housing with which the interior of the valve is closed. Since the stop is present at the cover, the stop reaches its installation position when placing the cover on the housing jacket.

An inexpensive and simple configuration results when the stop and the cover are together configured as one piece with each other. This reduces the mounting expenditure as well as the costs for producing the cover with stop.

Advantageously, the closing force which is acting on the valve element is generated by at least one closing element such as a pressure spring. As a pressure spring, preferably a coil pressure spring can be used with which the valve element can be uniformly loaded about its circumference.

Advantageously, between the stop and the jacket of the housing an annular space is formed which is engaged by the closing element loading the valve element. In this way, a positioning of the closing element in position within the housing is provided also.

The stop for the valve element in its second position can also be formed by the cover of the housing.

In this context, it is advantageous when the valve element is provided with an axial plunger that projects through a guide opening in the cover and is guided in the guide opening.

In another embodiment, the stop is provided at the jacket of the housing. In this case, the stop is advantageously formed by at least one flange part projecting transversely away from the jacket. When the jacket is comprised of metal, the flange part can be provided in a simple way by a bending process.

In a particularly advantageous embodiment, the stop is formed by an annular flange at an end of the jacket of the housing.

Advantageously, the housing is provided at an inlet-side end with a radially outwardly projecting annular flange. With it, the valve can be secured at the container in the installation position.

The annular flange is preferably covered at least at its side which is facing the other end of the housing at least partially with at least one sealing element. With it, the annular flange in the installation position is contacting the inner wall of the container and ensures that the gases contained in the container can reach the valve element only through the valve inlet.

A particularly advantageous embodiment results when the sealing element is designed such that it engages around the rim of the annular flange.

In order to be able to achieve in the installation position of the valve a reliable sealing action at the container wall in a simple way, the sealing element is provided at its side facing the other end of the housing with a circumferentially extending annular bead. It is elastically compressed in the installation position of the valve so that a proper sealing action is ensured.

The valve element can be designed such that it itself is comprised of a gas-permeable material, for example, expanded or pressed PTFE or PE.

In an advantageous embodiment, the valve element is provided with a gas-permeable membrane. It is surrounded in an advantageous manner by an annular body at which the membrane can be reliably held.

For supporting the membrane, it is advantageous when the latter is supported by at least one support web with respect to the inlet-side pressure.

The valve element can be held in a particularly advantageous embodiment in a its first position by magnetic force. The closing force which is acting on the valve element is adjusted such that the valve element is displaced against the force acting on it only when the pressure generated in the container is so large that it must be quickly relieved in order to prevent damage to the container due to pressure that is too high.

Since the magnetic force/stroke line is a falling characteristic line, the valve element can be displaced quickly and reliably in the direction toward the second position. The outlet is opened in this way depending on the position of the valve element partially or completely so that the valve can be constructed smaller and thus more cost-efficiently while having the same air throughput.

In an advantageous embodiment, the valve can comprise at least one pressure compensation element by means of which in normal operation pressure differences between the container and the environment can be compensated. With the pressure compensation element, aeration and ventilation of the container interior are ensured.

The pressure compensation element is advantageously an elastically deformable elastomer part that is connected to the valve element. In this way, the pressure compensation element is displaced together with the valve element. The pressure compensation element is advantageously provided with at least one opening by means of which the interior of the container is connected to the environment in normal operation and in the first position of the valve element. The pressure compensation element is installed such that it is under radial tension. It ensures that the opening which is advantageously a slot is closed by a closing force that is provided by the radial tension. This closing force is provided or adjusted such that gases contained in normal operation in the container open the opening of the pressure compensation element and can thus reach the environment of the valve or of the container.

Simple mounting of the valve results when at the housing at least one spring tongue is provided which forms a locking element for attachment of the valve at the container. The spring tongue is first elastically bent upon mounting of the valve such that the valve can be pushed through an installation opening in the container. As soon as the spring tongue exits from the installation opening, the spring tongue returns into its initial position so that the valve is locked at the container.

The container according to the invention is provided with at least one valve according to the invention.

The container is provided with at least one installation opening for installation of the valve. It can be located at any suitable location of the container.

Advantageously, the valve is seal-tightly resting with its radial flange in the installation position at the inner side of the container.

The subject matter of the application not only results from the subject matter of the individual claims but also from all specifications and features disclosed in the drawings and the description. They are, even though they are not subject matter of the claims, claimed as important to the invention as far as they are, individually or in combination, novel with respect to the prior art.

Further features of the invention result from the further claims, the description, and the drawings.

BRIEF DESCRIPTION OF THE DRAWINGS

The invention will be explained in more detail with the aid of four embodiments illustrated in the drawings. It is shown in FIG. 1 in schematic illustration a valve according to the invention that is arranged at a housing of a battery of an electric vehicle.

DESCRIPTION OF PREFERRED EMBODIMENTS

Figure 1:
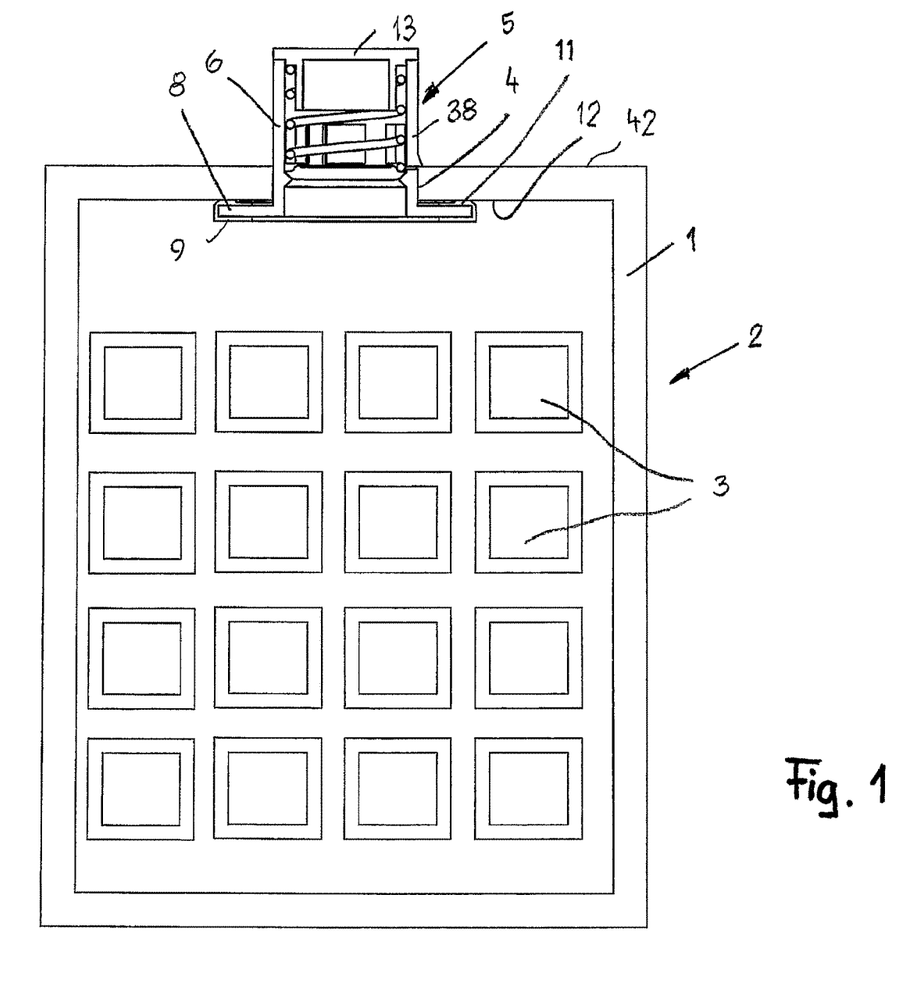

The valves disclosed in the following serve for aeration and ventilation of a housing interior such as, for example, the housing 1 of a battery 2 of an electric vehicle. In the housing 1, battery modules 3 are accommodated in a known manner. Each battery module 3 is comprised of a plurality of battery cells (FIG. 1).

The housing 1 is advantageously comprised of metal and has at least one installation opening 4 into which a valve 5 is inserted. It is seated seal-tightly in the installation opening and ensures a pressure compensation between the pressure in the interior of the housing 1 and the external pressure. The valve 5 ensures that the housing 1 does not deform noticeably due to fluctuations of the outer air pressure or the outer temperature.

Aside from the battery modules 3, the housing 1 comprises further components which are not illustrated for reasons of clarity. These additional components are generally known in such batteries 2 and comprise, for example, components for the management of the battery modules 3.

The housing 1 can have any suitable configuration. Depending on the size of the housing 1, more than only one valve 5 can be present also.

The installation opening 4 and the valve 5 can be provided at any suitable side of the housing 1.

The valve 5 is designed such that it enables a pressure compensation in the described manner and can provide at the same time an emergency venting of the housing 1 when in the housing 1, e.g. as a result of a short-circuit fault, an excess pressure should occur, for example, in that one or a plurality of battery cells or modules begin to burn. Then, the valve ensures that the interior of the housing 1 can be abruptly connected to the environment so that the pressure in the housing 1 can be relieved abruptly.

Figure 2:
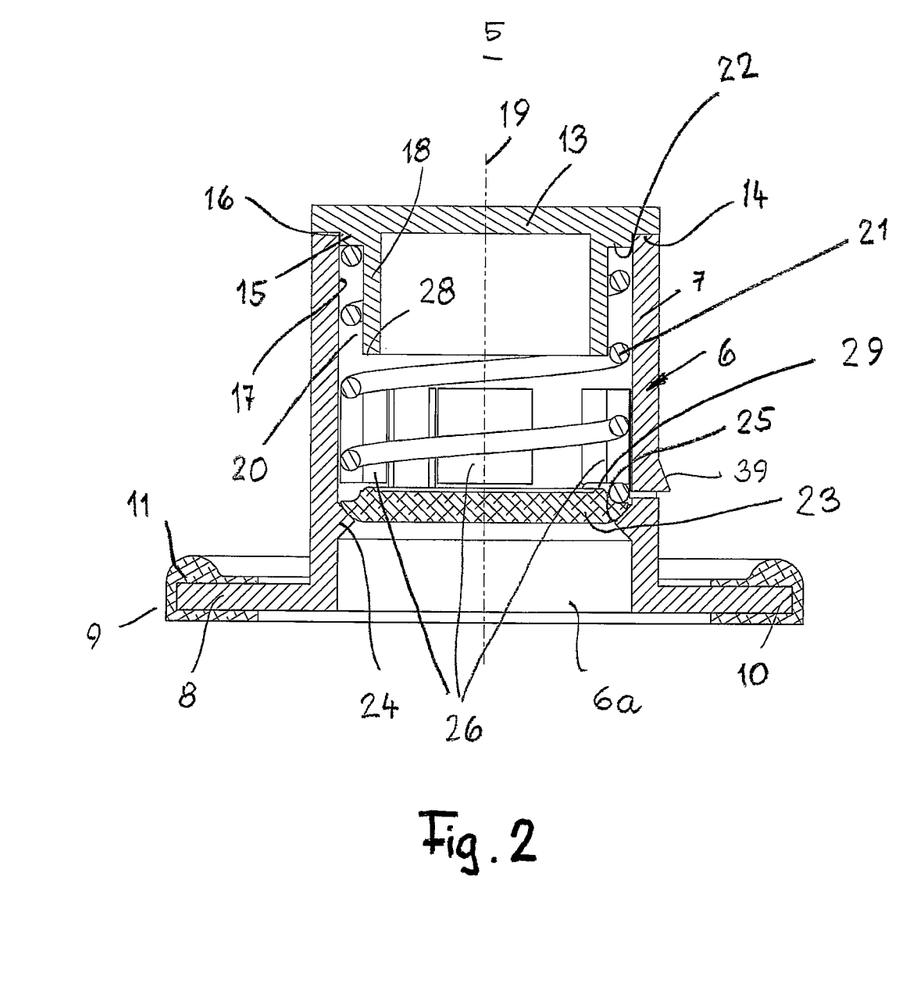
FIG. 2 in an enlarged illustration and in axial section the valve according to the invention in a first position.

The valve 5 has a housing 6 with a jacket 7 that is advantageously cylindrically embodied and provided with an inlet 6a. At its inlet-side end, the jacket 7 passes into a radially outwardly extending annular flange 8 whose outer rim is engaged around by a sealing element 9. The annular flange 8 is covered across a part of its radial width at the bottom side and its top side by the sealing element 9 that is fastened in a suitable way at the annular flange 8. In addition, the sealing element 9 covers also the rim 10 of the annular flange 8 (FIG. 2).

At the top side that is facing the jacket 7, the sealing element 9 is provided with an annular bead 11 which extends across the circumference of the annular flange 8 near its outer rim and which comprises advantageously a part-circular cross section.

In the installation position according to FIG. 1, the annular flange 8 is seal-tightly resting with intermediate positioning of the sealing element 9 at the inner side 12 of the housing 1. The circumferentially extending annular bead 11 of the sealing element 9 is elastically deformed in this context. In this way, it is ensured that the annular flange 8 is contacting seal-tightly the housing inner side 12.

The valve housing 6 is attached in a suitable way to the housing 1, for example, clipped on.

The housing 6 projects through the installation opening 4 outwardly out of the housing 1.

The housing 6, at its end which is facing away from the annular flange 8, is closed by a cover 13 which is connected fixedly to the jacket 7. In the embodiment, the cover 13 with its outer rim is seated on the end face 14 of the jacket 7. At its bottom side, the cover 13 is provided with a circumferentially extending projection 15 that is designed such that it is contacting with its outer rim 16 the inner side 17 of the jacket 7. The projection 15 enables thus a proper centering of the cover 13 relative to the jacket 7.

The projection 15 passes at its radial inner region into a socket 18 whose axis coincides with the axis 19 of the housing 6. The socket 18 is surrounded at a distance by a part of the jacket 7. An annular space 20 into which one end of a pressure spring 21 projects is formed between the socket 18 and the region of the jacket 7 facing away from the annular flange. The radial width of the annular space 20 is so large that the pressure spring 21 can move appropriately in the annular space 20 in case of a pressure loading.

The pressure spring 21 is supported with its one end at an end face 22 of the projection 15. With its other end, the pressure spring 21 loads a valve element 23 which is a plate-shaped piston in the embodiment. It is positioned under the force of the pressure spring 21 at a valve seat 24 which is provided at the inner side 17 of the jacket 7. In an exemplary manner, the valve seat 24 is of a conical shape. The piston 23 has a corresponding seat surface 25 with which it is contacting seal-tightly the valve seat 24 under the force of the pressure spring 21.

The valve seat 24 is advantageously embodied as one piece together with the jacket 7. The valve seat 24 is positioned at a minimal axial spacing relative to the annular flange 8.

In normal operation of the battery 2, the piston 23 is contacting the valve seat 24 under the force of the pressure spring 21 in accordance with FIG. 2. In this position, the piston 23 has an axial distance from the socket 18.

In the region between the socket 18 and the valve seat 24, at least one outlet opening 26 is provided at the jacket 7 through which, in case of fire or explosion at a battery cell in the battery housing 1, a corresponding pressure can be relieved quickly so that damage to neighboring battery cells or modules or the battery housing 1 is prevented. In the embodiment, a plurality of outlet openings 26 are provided about the circumference of the jacket 7 and have a sufficiently large cross section so that pressure relief can be realized in a very short period of time.

In normal operation of the battery 2, the outlet openings 26 are separated by the piston 23 from the interior of the housing 1.

Figure 3:
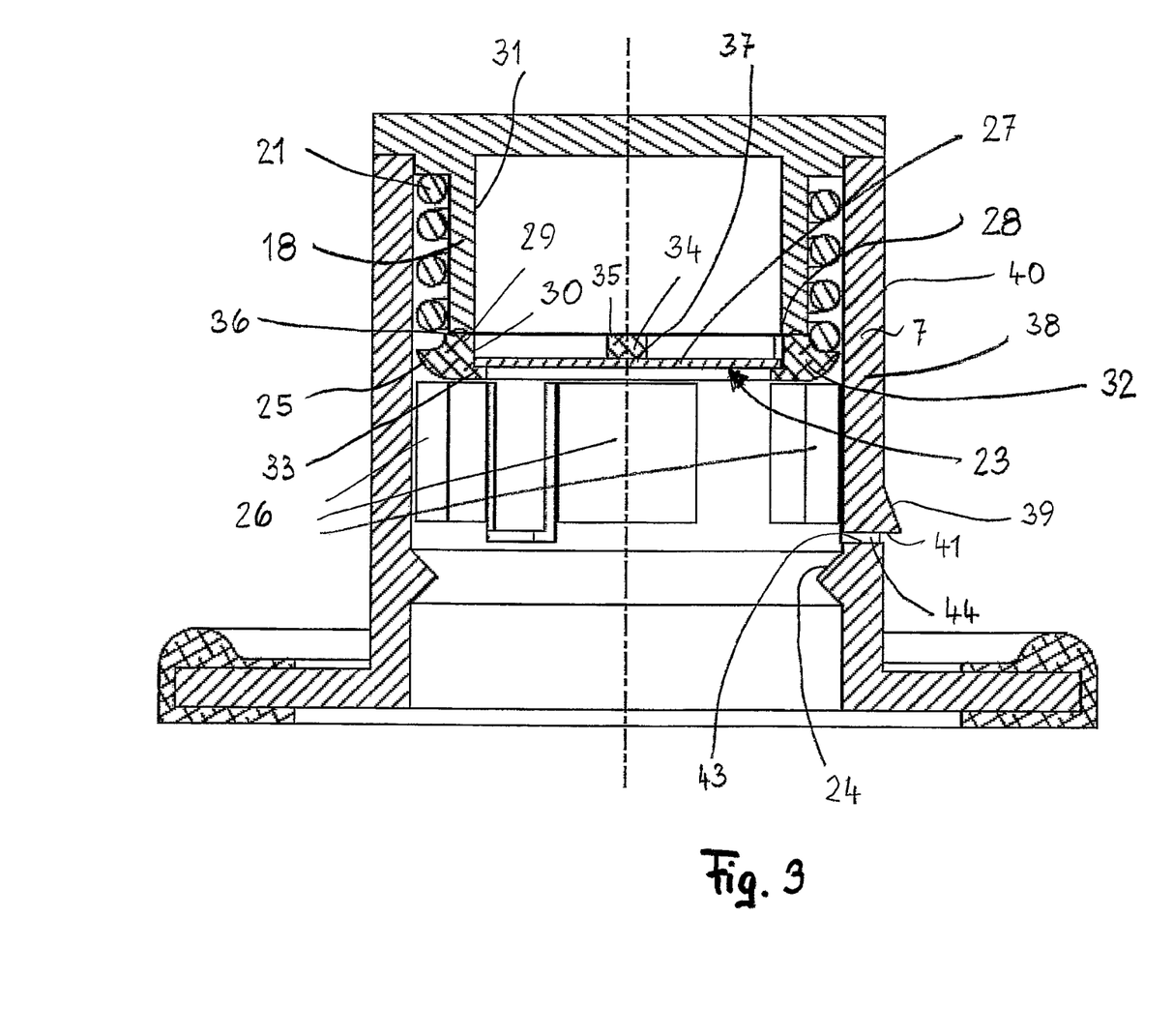
FIG. 3 in an illustration corresponding to FIG. 2 the valve according to the invention in a second position with a different embodiment of the valve element.

In order for a pressure compensation to take place at normal conditions between the interior of the housing 1 and the environment of the housing 1, a permeable membrane 27 can be provided in the piston 23, as shown in FIG. 3, or the piston 23 itself is configured such that it is gas-permeable and ensures the pressure compensation in this way (FIG. 2).

In the closed position of the piston 23 (FIG. 2), the pressure compensation between the interior of the battery housing 1 and the environment is performed exclusively through the permeable material of the piston 23 or its membrane 27. After passing through the piston 23, the corresponding gas can reach the exterior via the outlet openings 26.

The pressure spring 21 is adjusted such that it holds the piston 23 at normal conditions in contact at the valve seat 24.

When in the housing 1, for example, due to a short-circuit fault, a high pressure occurs, an ignition of the battery module 3 or of the battery cells may happen. Then, the piston 23 is abruptly lifted off the valve seat 24 by this high pressure in the battery housing 1 against the force of the pressure spring 21. The force of the pressure spring 21 is adjusted such that the piston 23 under the higher pressure in the battery housing 1 is moved in the direction toward the end face 28 (FIG. 2) of the socket 18. At very high pressure and a correspondingly adjusted minimal spring force, the piston 23 can be pushed so far that it contacts the end face 28 of the socket 18. This position is illustrated in FIG. 3. The piston 23 in this position assumes such a position that the outlet openings 26 are open and connected directly with the interior of the battery housing 1. In this way, the excess pressure existing in the battery housing 1 can be quickly relieved via the outlet openings 26 which are now open.

The socket 18 and/or the piston 23 are designed such that in the stop position according to FIG. 3 the entire cross section of the outlet openings 26 is directly connected with the interior of the battery housing 1.

The outlet openings 26 are provided such that the piston 23 already after a short displacement stroke moves past the lower rim of the outlet openings 26. Since the outlet openings 26 have a great length at least in circumferential direction of the jacket 7 of the housing 6, a large flow cross section for the gas is available already after a short displacement stroke.

The outlet openings 26 have a cross section that is advantageously larger than the cross section of the inlet 6a so that a quick pressure relief can be achieved.

As soon as the excess pressure in the battery housing 1 has been relieved, the piston 23 is pushed again against the valve seat 24 by the pressure spring 21 (FIG. 2).

As a result of the described configuration of the valve 5, an exchange of valve parts in case of an emergency is not required. The excess pressure in the battery housing 1 leads only to the piston 23 being lifted off the valve seat 24 and the outlet openings 26 being opened at least partially so that the excess pressure can be abruptly and quickly relieved and, in this way, a damage to the battery housing 1 does not occur. After a malfunction, it is therefore not necessary to exchange the valve 5 or to replace individual valve parts.

In order for the piston 23 to be reliably displaced in the housing 6 of the valve 5, its outer diameter is slightly smaller than the inner diameter of the jacket 7.

Advantageously, the radially outer rim of the piston 23 is reduced in regard to its thickness. The pressure spring 21 is resting in this rim region at the piston 23.

Advantageously, the piston 23 is provided with an annular projection 29 in the region in which it can contact the end face 28 of the socket 18. In particular, when the piston 23 is provided with the permeable membrane 27 (FIG. 3), a damage to the membrane 27 is prevented by the annular projection 29 should the piston 23 be pushed 21 by the excess pressure in the battery housing 1 against the socket 18 against the force of the pressure spring. Due to the excess pressure in the battery housing 1, the piston 23 is suddenly displaced in the direction toward the socket 18 in order to ensure the access to the outlet openings 26 within a very short period of time.

In the embodiment according to FIG. 3, the membrane 27 is advantageously configured such that it comprises an outer diameter which corresponds to the inner diameter of the socket 18. The membrane 27 is recessed relative to the end face of the projection 29 so that it does not become damaged in case of a possible contact of the projection 29 at the socket end face 28.

As further shown in FIG. 3, the projection 29 is designed such that its cylindrical inner side 30 forms at least approximately a steady continuation of the inner side 31 of the socket 18 in the contact position at the socket 18. The membrane 27 is attached in a suitable way to the piston 23. In the embodiment according to FIG. 3, it has an annular body 32 which comprises at its outer side the sealing surface 25 for contact at the valve seat 24.

From the inner side 30 of the annular body 32 an annular support 33 is projecting radially inwardly on which the membrane 27 is resting with its rim region. The support 33 is advantageously provided at the end of the annular body 32 which is facing the valve seat 24.

The annular body 32 of the piston 23 surrounds at least one diagonally extending web 34 which adjoins the inner side 30 of the annular body 32 with both ends. Advantageously, the piston 23 has a plurality of such diagonally extending webs 34 which cross each other at half the length. The webs 34 are advantageously embodied as one piece together with the annular body 32.

The webs 34 support the membrane 27 at the side which is facing away from the valve seat 24. As can be seen in FIG. 3, the webs 34 are configured such that their top side 35 is positioned in the same plane as the end face 36 of the annular body 32. The membrane 27 is contacting the bottom side 37 of the webs 34.

The webs 34 ensure that the membrane 27 is not impermissibly deformed when a corresponding pressure is acting on the membrane 27.

The jacket 7 is provided with at least one resilient tongue 38 which at the free end is provided with an outwardly extending slanted surface 39 which projects past the outer side 40 of the jacket 7 (FIGS. 2 and 3).

The at least one spring tongue 38 makes it possible to lock the valve 5 in a simple manner at a wall of the housing 1.

The valve 5 is pushed from the inner side of the housing 1 through the installation opening 4. In doing so, the slanted surface 39 of the spring tongue 38 reaches the rim of the installation opening 4 whereby the spring tongue 38 is elastically bent radially inwardly. As soon as the spring tongue 38 is released by the rim of the installation opening 4, the tongue 38 springs outwardly and locks in this manner the valve 5 at the corresponding wall of the battery housing 1. In the installation position, the spring tongue 38 with its end face 41 is resting against the outer side 42 of the corresponding housing wall (FIG. 1).

So that the tongue 38 can be bent reliably in an elastic manner, the end face 41 has a sufficient distance from the oppositely positioned rim 43 of an opening 44 in which the spring tongue 38 is positioned.

The spring tongue 38 is provided such that the valve 5 in the installation position is seal-tightly resting with its sealing element 9 with sufficient force at the inner side 12 of the housing wall.

Figure 4:
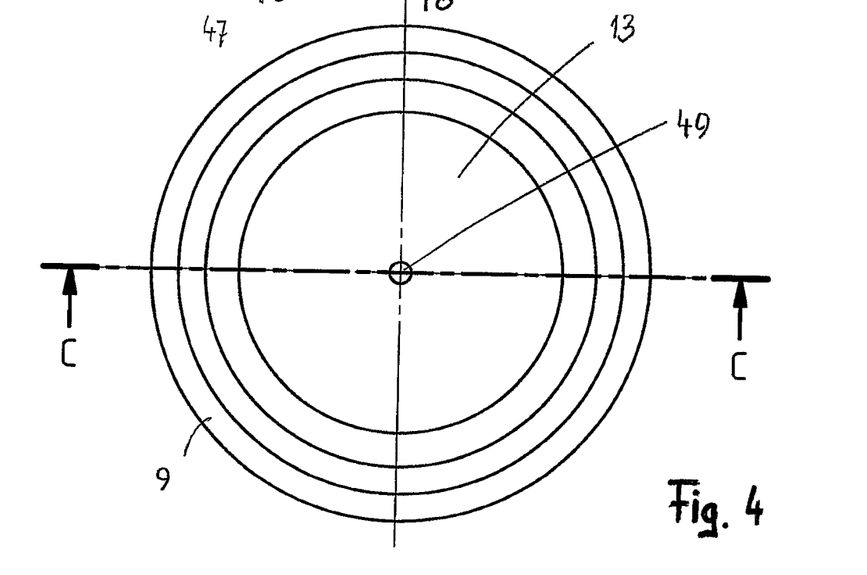
FIG. 4 a plan view of a second embodiment of a valve according to the invention.
Figure 5:
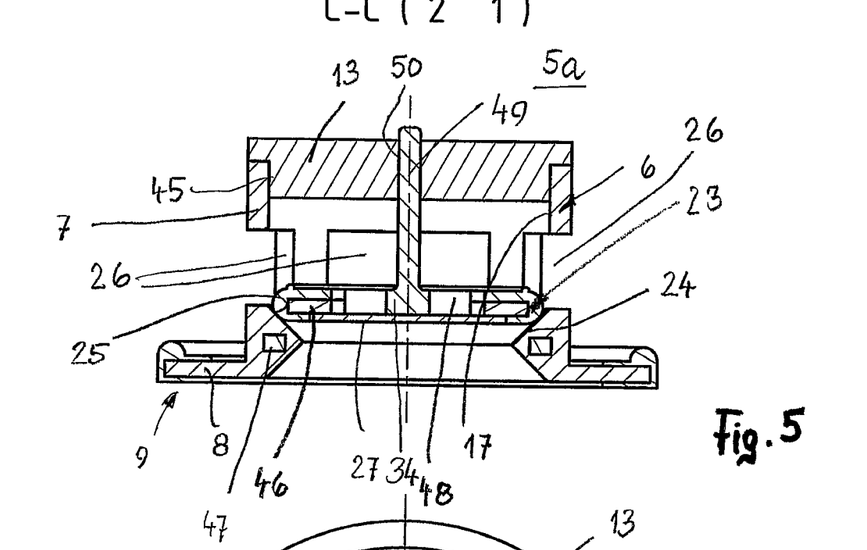
FIG. 5 a section along the line C-C in FIG. 4.

The valve according to FIGS. 4 and 5 differs from the preceding embodiment substantially in that the closing force acting on the piston 23 is not produced by a pressure spring but by magnetic forces. The valve 5a according to FIGS. 4 and 5 has the housing 6 with the jacket 7 in which the outlet openings 26, arranged in distribution about the circumference, are provided. The jacket 7 engages with its upper end an outer circumferentially extending recess 45 of the cover 13 which is connected in a suitable manner fixedly to the jacket 7.

In accordance with the preceding embodiment, the jacket 7 is provided at its end which is facing away from the cover 13 with the radial flange 8 whose rim is engaged about by the sealing element 9.

In the closed position illustrated in FIG. 5, the piston 23 is contacting in the described manner the valve seat 24 which is provided at the inner side 17 of the jacket 7. The piston 23 has the seat surface 25 with which it is contacting seal-tightly the valve seat 24 in the closed position.

At least one magnet 46 which is advantageously designed as a magnetic ring is embedded in the piston 23. At least one ferromagnetic body serves as a counter piece 47 and is also preferably designed as a ring. It is embedded in the region of the valve seat 24 in the jacket 7.

It is possible to switch the position of magnet 46 and counter piece 47 so that then the magnet 46 is located in the jacket 7 and the counter piece 47 in the piston 23.

Instead of the ferromagnetic counter piece 47, a magnet can be used also which has an opposite pole direction relative to the magnet 46.

The magnet 46 is advantageously embedded completely in the piston 23. In the embodiment (FIG. 5), the inner side of the magnet 46 is not covered by the material of the piston 23.

The magnetic forces are selected such that the piston 23 in normal operation is contacting seal-tightly the valve seat 24 of the housing 6. In order for a pressure compensation to take place at normal conditions between the interior of the housing 1 and the environment of the housing, the piston 23 is designed such that it comprises the permeable membrane 27 or is itself designed such that it is gas-permeable.

The pressure compensation in the housing 1 can be realized via the permeable membrane 27 and the region 48 surrounded by the magnet 46 through the piston 23 and further via the outlet openings 26 to the exterior.

As soon as in the housing 1 the described high pressure occurs, for example, due to a short-circuit fault, the piston 23 is abruptly lifted off the valve seat 24 by this high pressure against the magnetic forces. The magnetic forces are selected correspondingly in such a way that the piston 23 is abruptly displaced upwardly (in relation to the illustration according to FIG. 5) so far that the outlet openings 26 are open. In this way, the interior of the battery housing 1 is connected immediately with the outlet openings 26 so that the excess pressure occurring in the battery housing 1 can be relieved very quickly.

So that the piston 23 does not reach a slanted position when displaced, it is guided by at least one guide element 49 in the cover 13. It has a guide opening 50 penetrating it through which the guide element 49 is projecting. It is advantageously embodied as a plunger which is contacting the wall of the guide opening 50 and is connected with its one end fixedly to the piston 23. The guide element 49 projects away from the web or webs 34 which are arranged and embodied in accordance with the preceding embodiment. Advantageously, the webs 34 and the guide element 49 are embodied together as one piece. Since also the webs 34 are advantageously embodied as one piece together with the annular body 32 of the piston 23, the piston 23 with the guide element 49 and the webs 34 can be produced and mounted easily.

Since in this embodiment a pressure spring is not provided, the valve 5a can be designed to be very compact, in particular in axial direction.

Deviating from the illustrated embodiment, the magnet 46 and the counter piece 47 can also be provided in the cover 13 as well as in the guide element 49. The piston 23 can then also be held by magnetic force in its closed position illustrated in FIG. 5.

The magnetic force acting on the piston 23 is adjusted such that the piston 23 can be pushed to the point of contacting the cover 13 when the described increased pressure occurs so that the outlet openings 26 are completely opened and the pressure can be relieved quickly. As soon as the pressure relief has taken place, the piston 23 is returned into its closed position as a result of the magnet force acting on it.

The guide element 49 ensures that the piston 23 does not become slanted when performing its stroke. In this way, it is ensured that the piston 23 in case of emergency is adjusted reliably into its release position. The seat surface 25 of the piston 23 is embodied of a curved configuration, viewed in axial section, in accordance with the preceding embodiment. This curved design of the seat surface 25 contributes to a proper seal-tight contact at the valve seat 24.

Figure 6:
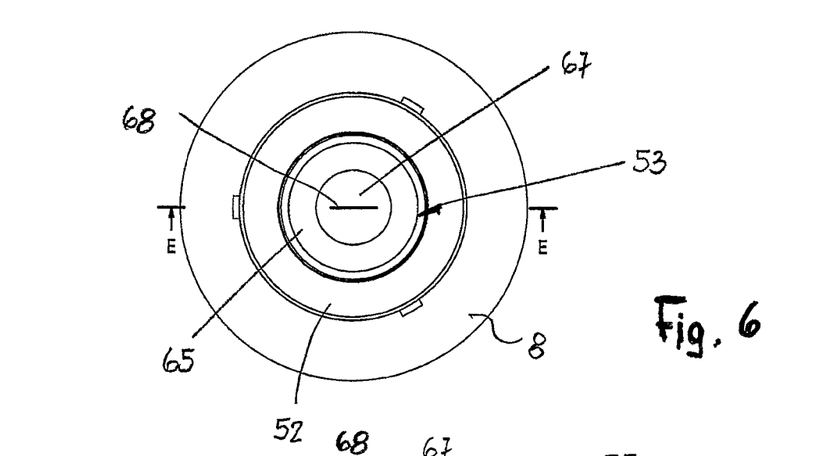
FIG. 6 a plan view of a third embodiment of a valve according to the invention.
Figure 7:
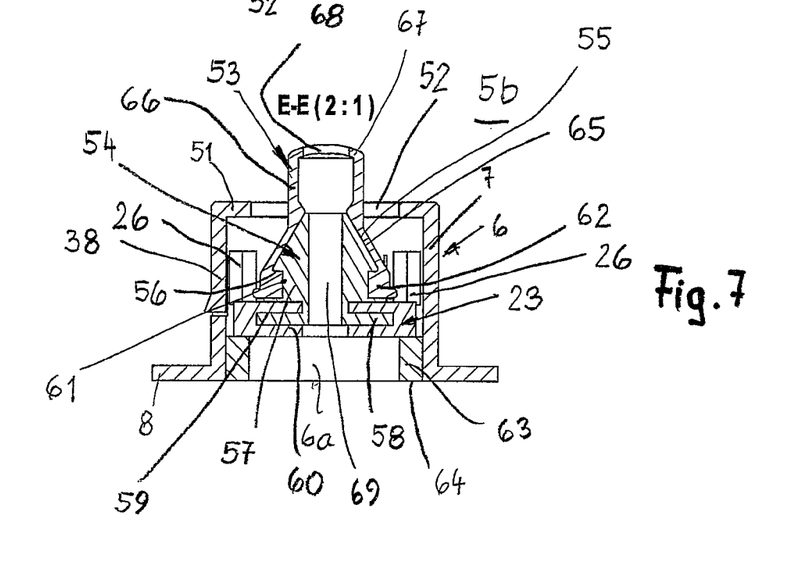
FIG. 7 a section along the line E-E in FIG. 6.

The valve 5b according to FIGS. 6 and 7 has the housing 6 with cylindrical jacket 7 which at one end passes into the radial flange 8. At the other end, the jacket 7 is provided with a radially inwardly oriented annular flange 51 which serves as a stop for the piston 23 when it is displaced in the described manner upon occurrence of a correspondingly high pressure in the container 1.

The annular flange 51 surrounds an outlet opening 52 through which a pressure compensation element 53 serving for aeration and ventilation is projecting. It is embodied in a cap shape and is seated on a support body 54 which is connected to the piston 23. The support body 54 has a conical part 55 which tapers in the direction toward the outlet opening 52. By means of a circumferentially extending projection 56, the conical part 55 passes with its wider end into a cylindrical central part 57. It has a smaller outer diameter than the conical part 55 at its wider end.

The central part 57 connects the conical part 55 with a fastening part 58 that has a larger outer diameter than the central part 57 and with which the support body 54 is connected to the piston 23.

The fastening part 58 comprises a circumferential groove 59 which is engaged by the piston 23. It is formed by a flat annular disk which has a circumferentially extending groove 60 at the inner circumference. By means of the grooves 59, 60, the support body 54 or its fastening part 58 and the piston 23 are connected with form fit to each other in that they engage each other with their respective sections.

The central part 57 is provided at its outer side with an annular groove 61 into which a thicker holding part 62 of the pressure compensation element 53 engages with form fit.

The outer diameter of the piston 23 is smaller by a sufficient amount than the inner diameter of the housing jacket 7 so that the piston 23 can be displaced reliably in the housing 6 in order to enable a quick pressure relief.

In the closed position, the piston 23 is resting seal-tightly on a sleeve 63 which is fastened to the inner side of the housing jacket 7. The sleeve 63 is provided such that its one end face 64 is positioned flush with the bottom side of the annular flange 8 of the jacket 7. The axial height of the sleeve 63 is selected such that it has sufficient spacing from the spring tongues 38 that enable in the described manner the locking of the valve at the wall of the housing 1.

The pressure compensation element 53 is comprised of elastomer material and has across its height a circular cross section. At its one end it is provided with the holding part 62 that is designed such that it contacts the bottom and the sidewalls of the annular groove 61 of the central part 57 of the support body 54.

A conical transition section 65 adjoins the holding part 62 and is contacting about its circumference and its height the outer side of the conical part 55.

Approximately at the level of the free end of the conical body 55, the transition section 65 passes into a cylindrical hollow end section 66 which, in the closed position of the piston 23, projects with the greater portion of its axial length through the outlet opening 52 of the housing 6. The outer diameter of the end section 66 is significantly smaller than the inner diameter of the annular flange 51 so that the movement of the piston 23 is not impaired.

The end section 66 has at the free end a closure part 67 in which a slot 68 is located.

In the embodiment, the slot 68 which penetrates the closure part 67 is positioned so as to extend diametrically. The slot 68 has a spacing from the cylindrical jacket of the end section 66 (FIG. 7).

In deviation from the illustrated embodiment, the slot 68 can also have any other suitable configuration. It can be provided during manufacture of the pressure compensation element 53. However, the slot 68 can also be attached subsequently to the closure part 67.

The piston 23 and the conical part 55 of the support body 54 have centrally an axial through opening 69 so that the inlet 68 of the valve is in flow communication with the slot 68.

The pressure compensation element 53 is snapped onto the support body 54. In this context, the pressure compensation element 53 is designed such that it is seated with radial pretension on the support body 54. Due to this radial pretension, a closure tension is acting on the slot 68 which holds it in closed position. The pressure compensation element 53 is configured such that the closing force which is acting on the slot 68 can be overcome by the pressure produced in the housing 1 whereby the slot 68 is opened and pressure differences relative to the environment can be compensated. In this way, at normal conditions, the pressure difference between the interior of the housing 1 and the environment can be relieved reliably. At these normal conditions, the valve is a breather valve as in the preceding embodiments.

The piston 23 with the pressure compensation element 53 is held by magnetic force in the closed position illustrated in FIG. 7. Corresponding to the preceding embodiment, in the piston 23 or in the sleeve 63 at least one magnet can be provided which has correlated therewith a corresponding counter piece in the respective other part. Also, two magnets with opposite polarity can be provided in the piston 23 and in the sleeve 63 which attract each other. The magnetic force is adjusted such that the piston 23 at normal conditions does not lift off the sleeve 63 so that a pressure compensation between the interior of the housing 1 and the environment is performed exclusively through the inlet 6a of the valve 5b, through the axial through opening 69, and the slot 68 with the atmosphere.

Since the end section 66 is configured as a hollow body and has only a minimal wall thickness, the slot 68 can be opened easily even at minimal pressures by elastic deformation of the end section 66 or its closure part 67. As soon as a pressure compensation has taken place, the slot 68 closes again.

As in the preceding embodiments, the outlet openings 26 are provided in distribution about the circumference of the jacket 7. In closed position of the piston 23, the outlet openings 26 are sealed so that a pressure compensation is realized in the described manner exclusively through the slot 68 of the pressure compensation element 53.

When in the housing 1, for example, as a result of a short circuit fault, an excess pressure occurs, the piston 23 lifts off the sleeve 63 against the magnetic force at this high pressure and can be axially displaced so far that it contacts the annular flange 51 of the housing 7. In this position, the outlet openings 26 are completely released so that the interior of the housing 1 is connected to the environment and the pressure in the housing 1 can be abruptly relieved. After pressure compensation, the piston 23 returns into its closed position according to FIG. 7 in which it is secured by magnetic force.

The outlet opening 52 surrounded by the annular flange 51 of the jacket 7 is sufficiently large so that the pressure compensation element 53, upon displacement of the piston 23 into its stop position at the annular flange 51, does not come into contact with the rim of the outlet opening 52. In this way, a reliable pressure compensation is ensured in a danger situation.

Figure 8:
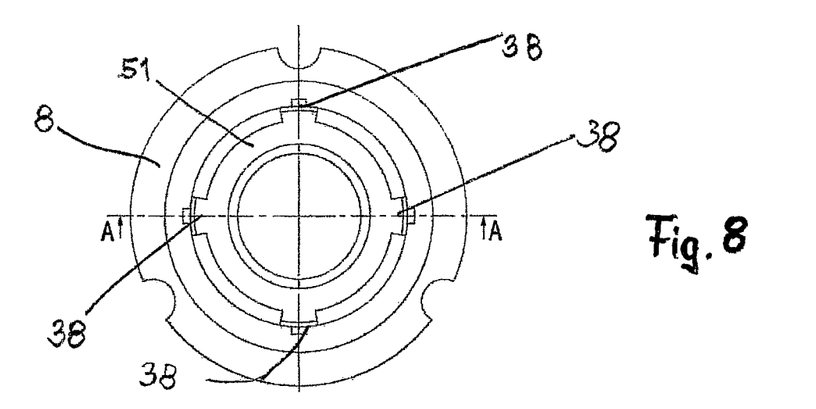
FIG. 8 a plan view of a further embodiment of a valve according to the invention.
Figure 9:
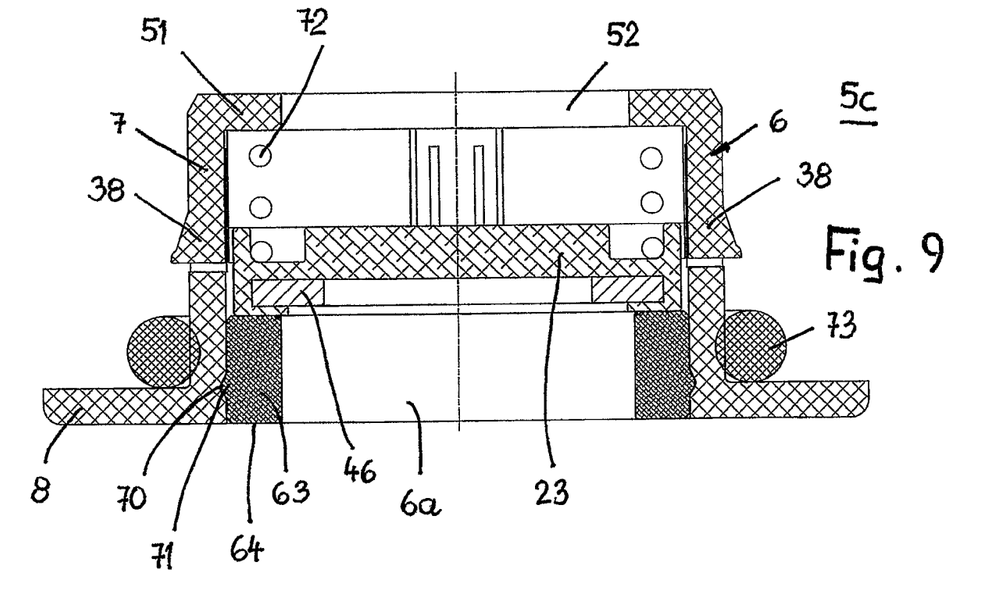
FIG. 9 in enlarged illustration a section along the line A-A in FIG. 8.
Figure 10:
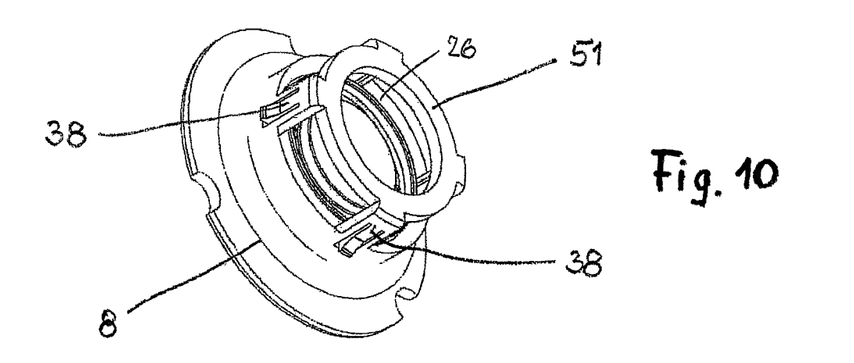
FIG. 10 the valve according to FIG. 8 in perspective illustration.

In the embodiment according to FIGS. 8 to 10, the piston 23 is also secured in its closed position by magnetic force. The housing 6 of the valve 5c is of the same configuration as in the preceding embodiment. The housing 6 has the cylindrical jacket 7 which at its one end comprises the radially outwardly oriented radial flange 8 and at its other end the radially inwardly positioned annular flange 51 which serves as a stop for the piston 23 when it is displaced upon occurrence of a corresponding high pressure in the container 1. The annular flange 51 surrounds the outlet opening 52.

The jacket 7 of the housing 6 is provided with the spring tongues 38 arranged in distribution about its circumference with which the valve 5c is attached to the housing 1 in the described manner.

The housing 6 is comprised in the embodiment of a hard plastic material but can also be comprised of metal.

As in the preceding embodiment, the sleeve 63 whose end face 64 is flush with the bottom side of the annular flange 8 of the jacket 7 is provided at the inner side of the housing jacket 7. The sleeve 63 can be connected by an adhesive connection with the housing jacket 7. In the embodiment, the sleeve 63 is also connected additionally with form fit to the housing jacket 7. It has an annular groove 70 engaged by the sleeve 63 with a circumferentially extending rib 71 projecting past its outer jacket. Advantageously, the annular groove 70 and the rib 71 have a part-circular contour. In this way, it is possible, for example, to insert the sleeve 63 from the side of the annular flange 8 into the housing jacket 7 wherein the sleeve 63 with the rib 71 locks easily in the annular groove 70.

With such a form fit connection, it is not necessarily required to connect the sleeve 63 additionally by material fusion to the housing jacket 7.

In accordance with the preceding embodiment, the sleeve 63, across its axial height, is contacting with its outer side the inner side of the housing jacket 7. The sleeve 63 delimits the inlet 6a.

The piston 23 is resting in the closed position illustrated in FIG. 9 against the end face of the sleeve 63 and is held in this closed position by magnetic force. The piston 23 comprises the magnet 46 which is embedded partially in the piston 23 and is of an annular configuration. The sleeve 63 serves as a counter piece to the magnet 46 and can be embodied as a ferromagnetic body.

In deviation from the illustrated embodiment, a ferromagnetic body, which is embodied preferably as a ring, can be embedded in the sleeve 63. The position of the magnet 46 and ferromagnetic body can also be switched. In this case, the magnet 46 is located in the sleeve 63 while the ferromagnetic counter piece is arranged in the piston 23.

Finally, there is the possibility to provide a magnet in the piston 23 as well as in the sleeve 63, respectively. The two magnets have then opposite polarity.

The outer diameter of the piston 23 is smaller than the inner diameter of the housing jacket 7 so that the piston 23 can be reliably displaced in the housing 1 should excess pressure occur in the housing 1.

The magnetic force is adjusted such that the piston 23 is contacting seal-tightly the sleeve 63 under normal conditions in the housing 1. The piston 23 can be comprised of permeable material or can comprise, in accordance with the embodiment according to FIG. 3, a permeable membrane which is permeable for gases. The gas passing through the piston 23 can reach the exterior through the outlet opening 52 as well as the outlet openings 26 which, in accordance with the preceding embodiments, are arranged in distribution about the circumference of the housing jacket 7. In this way, a reliable pressure compensation between the interior of the housing 1 and the environment is ensured.

When the described excess pressure occurs in the housing 1, then the piston 23 is lifted off the sleeve 63 by the high gas pressure in the housing 1 against the magnetic force and is moved against the annular flange 51 of the housing 6. In this stop position, the outlet openings 26 are open so that the high pressure in the housing 1 can be relieved through the inlet 6a and the opened outlet openings 26 within a very short period of time. After the pressure compensation, the piston 23 returns into its closed position according to FIG. 7.

In order for the piston 23 to reliably return into its closed position, it can be advantageous to support the return movement by at least one pressure spring 72. It is arranged in the region between the piston 23 and the annular flange 51. The pressure spring 72 is loosely resting on the piston 23 so that no spring force is acting on it in the closed position. In the closed position, the pressure spring 72 has a spacing from the annular flange 51. The pressure spring 72 is adjusted such that in the open position of the piston 23 it is deformed only slightly so that the spring force which is acting on the piston 23 is smaller than the increased pressure which is to be relieved in the described manner by displacement of the piston 23. By means of the pressure spring 72, it is ensured that the piston 23 in any case is returned into its closed position according to FIG. 9.

Since the annular flange 8 of the housing 6, in contrast to the preceding embodiments, is not engaged by a sealing element 9, an annular seal 73 is provided for sealing the valve 5c in the installation position and is arranged at the transition of the annular flange 8 into the housing jacket 7 and seal-tightly rests in the installation position of the valve 5c with elastic deformation at the inner side 12 of the housing 1.

The described valves are water-tight so that there is no risk that water penetrates into the battery housing 1.

The piston-shaped configuration of the valve element 23 is not to be understood as limiting. It can have any other suitable form.

What is claimed is:

1. A valve for pressure compensation and/or for emergency venting of a container, the valve comprising:
    a housing comprising a first end and an inlet arranged at the first end, wherein the inlet is configured to be closed by at least one valve element, wherein the at least one valve element is subjected to a closing force in a first position, and wherein the at least one valve element is at least partially gas-permeable;
    the housing further comprising at least one outlet located behind the at least one valve element when the at least one valve element assumes the first position;
    wherein the at least one valve element is configured to be adjusted in a direction toward a second position against the closing force when an increased pressure surpassing the closing force exists at the inlet;
    wherein, in the second position, the at least one valve element at least partially opens the at least one outlet such that the at least one outlet is directly connected in flow communication with the inlet;
    wherein the housing comprises a radially outwardly extending annular flange arranged at the first end;
    at least one sealing element arranged at the radially outwardly extending annular flange at a side of the radially outwardly extending annular flange facing a second end of the housing arranged opposite the first end, wherein the at least one sealing element covers at least partially the side of the radially outwardly extending annular flange facing the second end of the housing.

2. The valve according to claim 1, wherein the at least one sealing element engages about a rim of the radially outwardly extending annular flange.

3. The valve according to claim 1, wherein the at least one sealing element comprises a side facing the second end of the housing and the side facing the second end of the housing comprises a circumferentially extending annular bead.

4. A valve for pressure compensation and/or for emergency venting of a container, the valve comprising:
    a housing comprising a first end and an inlet arranged at the first end, wherein the inlet is configured to be closed by at least one valve element, wherein the at least one valve element is subjected to a closing force in a first position, and wherein the at least one valve element is at least partially gas-permeable;
    the housing further comprising at least one outlet located behind the at least one valve element when the at least one valve element assumes the first position;
    wherein the at least one valve element is configured to be adjusted in a direction toward a second position against the closing force when an increased pressure surpassing the closing force exists at the inlet;
    wherein, in the second position, the at least one valve element at least partially opens the at least one outlet such that the at least one outlet is directly connected in flow communication with the inlet;
    wherein, in the second position, the inlet and the at least one outlet are positioned on a same side of the at least one valve element so that a gas, for pressure compensation and/or emergency venting, flows immediately from the inlet to the at least one outlet without having to pass through the at least one valve element or having to flow past the at least one valve element;

wherein the housing comprises at least one spring tongue forming a locking element configured to lock the valve at the container.

5. A valve for pressure compensation and/or for emergency venting of a container, the valve comprising:
- a housing comprising a first end and an inlet arranged at the first end, wherein the inlet is configured to be closed by at least one valve element, wherein the at least one valve element is subjected to a closing force in a first position, and wherein the at least one valve element is at least partially gas-permeable;
- the housing further comprising at least one outlet located behind the at least one valve element when the at least one valve element assumes the first position;
- wherein the at least one valve element is configured to be adjusted in a direction toward a second position against the closing force when an increased pressure surpassing the closing force exists at the inlet;
- wherein, in the second position, the at least one valve element at least partially opens the at least one outlet such that the at least one outlet is directly connected in flow communication with the inlet;
- wherein, in the second position, the inlet and the at least one outlet are positioned on a same side of the at least one valve element so that a gas, for pressure compensation and/or emergency venting, flows immediately from the inlet to the at least one outlet without having to pass through the at least one valve element or having to flow past the at least one valve element;
- wherein the at least one valve element comprises a gas-permeable membrane.

6. The valve according to claim 5, wherein the gas-permeable membrane is surrounded by an annular body.

7. The valve according to claim 5, wherein the gas-permeable membrane is supported with respect to a pressure at the inlet by at least one support web.

8. A valve for pressure compensation and/or for emergency venting of a container, the valve comprising:
- a housing comprising a first end and an inlet arranged at the first end, wherein the inlet is configured to be closed by at least one valve element, wherein the at least one valve element is subjected to a closing force in a first position, and wherein the at least one valve element is at least partially gas-permeable;
- the housing further comprising at least one outlet located behind the at least one valve element when the at least one valve element assumes the first position;
- wherein the at least one valve element is configured to be adjusted in a direction toward a second position against the closing force when an increased pressure surpassing the closing force exists at the inlet;
- wherein, in the second position, the at least one valve element at least partially opens the at least one outlet such that the at least one outlet is directly connected in flow communication with the inlet;
- wherein the at least one valve element comprises a piston that is held by magnetic force in the first position.

9. The valve according to claim 8, further comprising at least one pressure compensation element disposed at the piston.

10. The valve according to claim 9, wherein the at least one pressure compensation element is an elastically deformable elastomer part connected to the piston, wherein the elastically deformable elastomer part comprises at least one opening closed by a closing force generated by an elastic deformation of the at least one pressure compensation element in the installation position.

11. A container comprising at least one valve for pressure compensation and/or for emergency venting of the container, the at least one valve comprising:
- a housing comprising a first end and an inlet arranged at the first end, wherein the inlet is configured to be closed by at least one valve element, wherein the at least one valve element is subjected to a closing force in a first position, and wherein the at least one valve element is at least partially gas-permeable;
- the housing further comprising at least one outlet located behind the at least one valve element when the at least one valve element assumes the first position;
- wherein the at least one valve element is configured to be adjusted in a direction toward a second position against the closing force when an increased pressure surpassing the closing force exists at the inlet;
- wherein, in the second position, the at least one valve element at least partially opens the at least one outlet such that the at least one outlet is directly connected in flow communication with the inlet;
- wherein, in the second position, the inlet and the at least one outlet are positioned on a same side of the at least one valve element so that a gas, for pressure compensation and/or emergency venting, flows immediately from the inlet to the at least one outlet without having to pass through the at least one valve element or having to flow past the at least one valve element; and
- wherein the at least one valve comprises an annular flange seal-tightly contacting an inner side of the container.

12. The container according to claim 11, comprising at least one installation opening for the at least one valve.

13. The container according to claim 11, wherein the container is a housing of a battery of an electric vehicle.

* * * * *